US012747309B2

(12) United States Patent
Park et al.

(10) Patent No.: US 12,747,309 B2
(45) Date of Patent: Sep. 29, 2026

(54) METHOD FOR PREPARING VINYL CHLORIDE-BASED POLYMER AND VINYL CHLORIDE-BASED POLYMER PREPARED THEREBY

(71) Applicant: LG CHEM, LTD., Seoul (KR)

(72) Inventors: Jae Hyun Park, Daejeon (KR); Joong Chul Lim, Daejeon (KR); Keun Hoon Yoo, Daejeon (KR); Hyun Min Lee, Daejeon (KR); Gyu Sun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 696 days.

(21) Appl. No.: 18/030,953

(22) PCT Filed: Jun. 28, 2022

(86) PCT No.: PCT/KR2022/009235

§ 371 (c)(1),
(2) Date: Apr. 7, 2023

(87) PCT Pub. No.: WO2023/277530

PCT Pub. Date: Jan. 5, 2023

(65) Prior Publication Data

US 2023/0383025 A1 Nov. 30, 2023

(30) Foreign Application Priority Data

Jul. 1, 2021 (KR) ........................ 10-2021-0086440

(51) Int. Cl.
*C08F 14/06* (2006.01)

(52) U.S. Cl.
CPC .................................... *C08F 14/06* (2013.01)

(58) Field of Classification Search
None
See application file for complete search history.

(56) References Cited

U.S. PATENT DOCUMENTS 4,058,495 A 11/1977 Serratore et al.
4,603,151 A 7/1986 Dinbergs
4,711,908 A 12/1987 Hawrylko
4,742,085 A 5/1988 Cozens
4,755,538 A 7/1988 Hawrylko
4,755,539 A 7/1988 Hawrylko
4,757,091 A 7/1988 Hawrylko
4,757,092 A 7/1988 Hawrylko
2004/0132930 A1 7/2004 Bonardi et al.
2018/0244815 A1 8/2018 Jeon et al.
2019/0300627 A1 * 10/2019 Nishimura ............ C08F 114/06
2020/0354490 A1 11/2020 Ahn et al.
2021/0317243 A1 10/2021 Park et al.

FOREIGN PATENT DOCUMENTS

CN 104961992 A 10/2015
CN 105968272 A 9/2016
CN 108034015 A 5/2018
CN 108467450 A * 8/2018 ............ C08F 214/06
CN 108530569 A 9/2018
CN 111393548 A * 7/2020 ................ C08F 2/42
GB 2078237 A * 1/1982 .............. C08F 14/06
JP S55-031820 A 3/1980
JP S61204207 A 9/1986
JP S62504 A 1/1987
JP S63-268713 A 11/1988
JP S63268706 A 11/1988
JP 09-278964 A 10/1997
JP 3066965 B2 7/2000
JP 2002060421 A 2/2002
JP 2004-534867 A 11/2004
JP 2017-061657 A 3/2017
JP 2021-512975 A 5/2021
KR 1995-0006127 B1 6/1995
KR 10-0868458 B1 11/2008
KR 10-2014-0055218 A 5/2014
KR 10-1683333 B1 12/2016
KR 10-1765842 B1 8/2017
KR 10-2017-0124959 A 11/2017
KR 10-2020-0050740 A 5/2020
KR 10-2208453 B1 1/2021
KR 10-2021-0034418 A 3/2021
WO 02/079279 A1 10/2002
WO 2019-189625 A 3/2019

* cited by examiner

*Primary Examiner* — Richard A. Huhn
(74) *Attorney, Agent, or Firm* — BRYAN CAVE LEIGHTON PAISNER LLP

(57) ABSTRACT

The present invention relates to a method for preparing a vinyl chloride-based polymer showing improved melting rate and mechanical properties and low harmfulness, by pre-mixing and injecting a mixed dispersant comprising polyvinyl alcohol of high hydration and a metal carbonate before performing polymerization, and then, polymerizing a vinyl chloride-based monomer, and a vinyl chloride-based polymer prepared through the method.

7 Claims, No Drawings

METHOD FOR PREPARING VINYL CHLORIDE-BASED POLYMER AND VINYL CHLORIDE-BASED POLYMER PREPARED THEREBY

CROSS-REFERENCE TO RELATED APPLICATIONS

The present application is a National Phase entry pursuant to 35 U.S.C. § 371 of International Application No. PCT/KR2022/009235 filed on Jun. 28, 2022, and claims priority to and the benefit of Korean Patent Application No. 10-2021-0086440, filed on Jul. 1, 2021, the entire contents of which are incorporated herein by reference.

FIELD

The present invention relates to a method for preparing a vinyl chloride-based polymer having a fast melting rate and the low content of a residual unreacted monomer, and keeping the high bulk density of the polymer, by using a mixed dispersant including a dispersant with a high degree of hydration and a metal carbonate in certain amounts, and a vinyl chloride-based polymer prepared thereby.

BACKGROUND

PVC is a typical thermoplastic resin, cheap, easy to control the hardness thereof, and has excellent physical chemical properties such as mechanical strength, climate resistance, and chemical resistance. Therefore, is used in various product fields such as films, sheets and molded articles.

In order to process a PVC resin into a final product, processes of mixing a suitable additive according to the properties required in each product field with the PVC resin, and extruding, are required. In this case, if the melting rate of the PVC resin mixture increases, the chain structure of a vinyl chloride-based polymer may be untied well, strong bonding may be formed from each other, and the mechanical properties of a final product may also be improved. On the contrary, if the melting rate is low, and the chain structure is insufficiently untied, micro gel particles may be formed during the processes, and the micro gel particles thus formed may act as the defects of a final product to deteriorate the mechanical properties. Accordingly, in product fields requiring high mechanical strength, a PVC resin having an even faster melting rate is necessary.

Meanwhile, a cold plasticizer absorption (CPA) is a main physical property representing the characteristics of the PVC resin, and if the CPA increases, the above-explained melting rate tends to increase. However, the CPA is in trade-off relationship with the bulk density of the vinyl chloride-based polymer, and if the bulk density of the vinyl chloride-based polymer increases, an extrusion rate during an extrusion processing may increase to improve productivity. That is, if the CPA of the PVC resin is increased to provide a PVC resin with excellent mechanical strength, there are defects degrading the bulk density reducing the productivity during the processing. Accordingly, in order to accomplish a suitable level of productivity and mechanical strength, research on a method for preparing a PVC resin having balanced CPA and bulk density is necessary.

(Patent Document 1) KR 10-2021-0034418 A (Patent Document 2) KR 10-2017-0124959 A

DISCLOSURE OF THE INVENTION

Technical Problem

The present invention is to provide a method for preparing a vinyl chloride-based polymer having excellent balance between the CPA and the bulk density of the vinyl chloride-based polymer, the reduced content of an unreacted monomer remaining in a final product, and a vinyl chloride-based polymer prepared thereby.

In order to solve the above challenges, there is provided in the present invention a method for preparing a vinyl chloride-based polymer.

The present invention provides a method for preparing a vinyl chloride-based polymer, comprising a step of injecting a mixed dispersant and a metal carbonate into a polymerization reactor (S1), and a step of polymerizing a vinyl chloride-based monomer in the presence of the mixed dispersant and the metal carbonate (S2), wherein the mixed dispersant comprises polyvinyl alcohol having a degree of hydration of 80 mol % or more, and an amount of the polyvinyl alcohol in the mixed dispersant is 50 to 60 wt %.

The present invention provides the method for preparing a vinyl chloride-based polymer as described above, wherein the mixed dispersant and the metal carbonate are pre-mixed and injected into the polymerization reactor.

The present invention provides the method for preparing a vinyl chloride-based polymer as described above, wherein the mixed dispersant further comprises polyvinyl alcohol having a degree of hydration of less than 80 mol %, and a cellulose-based dispersant.

The present invention provides the method for preparing a vinyl chloride-based polymer as described above, wherein the cellulose-based dispersant is one or more selected from the group consisting of methyl cellulose, hydroxyethyl cellulose and hydroxypropyl methylcellulose.

The present invention provides the method for preparing a vinyl chloride-based polymer as described above, wherein the metal carbonate is one or more selected from the group consisting of sodium carbonate ($Na_2CO_3$), potassium carbonate ($K_2CO_3$), and sodium bicarbonate ($NaHCO_3$).

The present invention provides the method for preparing a vinyl chloride-based polymer as described above, wherein the mixed dispersant is used in 0.05 to 0.15 parts by weight based on 100 parts by weight of the vinyl chloride-based monomer.

The present invention provides the method for preparing a vinyl chloride-based polymer as described above, wherein the metal carbonate is used in 0.01 to 0.03 parts by weight based on 100 parts by weight of the vinyl chloride-based monomer.

The present invention provides the method for preparing a vinyl chloride-based polymer as described above, wherein the polymerization is performed at 50 to 65° C.

The present invention provides a vinyl chloride-based polymer having the content of the vinyl chloride-based polymer in a surface layer measured by XPS analysis of 50% or more.

The present invention provides the vinyl chloride-based polymer as described above, having a cold plasticizer absorption (CPA) of 18% or more.

The present invention provides the vinyl chloride-based polymer as described above, having a bulk density of 0.580 $g/cm^3$ or more.

(12) The present invention provides the vinyl chloride-based polymer as described above, having a spherical particle shape.

The vinyl chloride-based polymer prepared using the preparation method of the present invention shows high CPA and bulk density simultaneously, and both productivity during extrusion processing and mechanical properties of a final product may be excellent, the content of an unreacted monomer is low, and the polymer is harmless.

DETAILED DESCRIPTION

Hereinafter, the present invention will be described in more detail.

It will be understood that words or terms used in the description and claims shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

Meanwhile, the term "vinyl chloride-based polymer" used in the present description comprehensively represents compounds produced by polymerizing a vinyl chloride-based monomer, i.e., a vinyl chloride monomer alone or a mixture of a vinyl chloride monomer and a vinyl-based monomer copolymerizable with the vinyl chloride monomer, and may mean a polymer chain derived from a vinyl chloride-based monomer.

Method for Preparing Vinyl Chloride-Based Polymer

The present invention provides a method for preparing a vinyl chloride-based polymer, comprising a step of injecting a mixed dispersant and a metal carbonate into a polymerization reactor (S1), and a step of polymerizing a vinyl chloride-based monomer in the presence of the mixed dispersant and the metal carbonate (S2), wherein the mixed dispersant comprises polyvinyl alcohol having a degree of hydration of 80 mol % or more, and an amount of the polyvinyl alcohol in the mixed dispersant is 50 to 60 wt %.

As explained above, the CPA and the bulk density of the vinyl chloride-based polymer are in a trade-off relationship, and in order to maintain appropriate levels of mechanical strength and productivity during extrusion, it is required to find a suitable balance between the CPA and the bulk density of the vinyl chloride-based polymer. As the results of a study for this purpose, the inventors of the present invention found that the CPA of the vinyl chloride-based polymer may be increased without loss of the bulk density, and the content of an unreacted monomer remaining in a final polymer may be reduced, by pre-mixing a mixed dispersant including polyvinyl alcohol of high hydration with a metal carbonate and then, polymerizing a vinyl chloride-based monomer in the presence of the mixture, and completed the method for preparing a vinyl chloride-based polymer of the present invention.

Hereinafter, the method for preparing a vinyl chloride-based polymer of the present invention will be explained step by step.

Injection Step of Mixed Dispersant and Metal Carbonate (S1)

The preparation method of the present invention includes a step of injecting a mixed dispersant and a metal carbonate into a polymerization reactor before performing polymerization reaction (S1).

The mixed dispersant used in this step is for playing the role of dispersing a vinyl chloride-based monomer injected in a subsequent step in a solvent, and may be a mixture of two or more different dispersants. At least one among the two or more dispersants included in the mixed dispersant may be polyvinyl alcohol of high hydration, having a degree of hydration of 80 mol % or more. Particularly, the degree of hydration of the polyvinyl alcohol of high hydration may be 85 mol % or more. If polyvinyl alcohol having such a high degree of hydration is mixed with another dispersant and used, there are advantages of further improving the stability of finally produced particles. Meanwhile, the polyvinyl alcohol used as a dispersant in this step can be a type of acetate partially substituted with an alcohol by hydrating polyvinyl acetate, and the degree of hydration is defined as the degree of substitution of an acetate with an alcohol.

The amount of the polyvinyl alcohol of high hydration in the mixed dispersant may be 50 to 60 wt %. If the amount of the polyvinyl alcohol is too small, the stability of particles during a polymerization process is reduced resulting in a large amount of scale, and vinyl chloride-based polymer particles may be obtained with an irregular shape. Further, and the bulk density of a finally prepared vinyl chloride-based polymer may be too low to avoid degrading an extrusion rate. On the contrary, if the amount of the polyvinyl alcohol of high hydration in the mixed dispersant is too large, pores in vinyl chloride-based polymer particles obtained may be reduced, and the cold plasticizer absorption may be reduced. Accordingly, the discharge of residual monomers to the air may not be smooth, and the content of an unreacted monomer remaining in a final product may be markedly increased.

The mixed dispersant may further include polyvinyl alcohol of low hydration, having a degree of hydration of less than 80 mol % and a cellulose-based dispersant, in addition to the above-explained polyvinyl alcohol of high hydration. If the polyvinyl alcohol of high hydration and the polyvinyl alcohol of low hydration are used together, basic physical properties including a polymer diameter and cold plasticizer absorption may be easily controlled, and polymer particles satisfying the basic physical properties required for a product having a skin layer of an acceptable thickness, and relatively fast meltability, may be obtained. The degree of hydration of the polyvinyl alcohol of low hydration may be less than 80 mol %, preferably, 50 to 75 mol %, and the polyvinyl alcohol of low hydration may include two or more types of polyvinyl alcohol having the degree of hydration in the above-described range.

The mixed dispersant may be used in 0.05 to 0.15 parts by weight, preferably, 0.08 to 0.12 parts by weight, based on 100 parts by weight of the vinyl chloride-based monomer. If the amount used of the mixed dispersant is too small, the above-described role of the mixed dispersant could be insufficiently performed, and polymer stability may be deteriorated. If the amount used of the mixed dispersant is too large, dispersant components remain and act as impurities in a final product, to adversely affecting product quality.

The cellulose-based dispersant may play the role of a protection colloid agent stabilizing the reactants during a polymerization process. As the cellulose-based dispersant, one or more selected from the group consisting of methyl cellulose, hydroxyethyl cellulose and hydroxypropyl methylcellulose may be used.

The metal carbonate used in this step may play the role of a pH adjustor and may reduce the content of an unreacted monomer which may remain in a final product. The metal carbonate may be dissolvable in water and ionized, particularly, one or more selected from the group consisting of sodium carbonate ($Na_2CO_3$), potassium carbonate ($K_2CO_3$) and sodium bicarbonate ($NaHCO_3$).

The metal carbonate may be used in 0.01 to 0.03 parts by weight, preferably, 0.015 to 0.025 parts by weight based on 100 parts by weight of the vinyl chloride-based monomer. If the amount of the metal carbonate used is too small, the above-explained roles of the metal carbonate could be insufficiently performed. If the amount of the metal carbonate used is too large, the components of the metal carbonate may affect the dispersant to degrade dispersion stability, and accordingly, the size of polymer particles may be excessively increased.

Meanwhile, the mixed dispersant and the metal carbonate may be mixed in advance and then, injected into a polymerization reactor in this step. By mixing and injecting the mixed dispersant and the metal carbonate before initiating polymerization reaction, the content of the vinyl chloride-based polymer in the surface layer of a final product may be increased even further, and through this, a melting rate may be increased.

Polymerization Step (S2)

As explained above, after injecting the mixed dispersant and the metal carbonate into the polymerization reactor, a vinyl chloride-based monomer may be injected, and the polymerization reaction may be performed. Particularly, the polymerization reaction in this step may be performed through a suspension polymerization method.

The vinyl chloride-based monomer may be one type of a vinyl chloride monomer, or a mixed monomer including a vinyl chloride monomer and a vinyl-based monomer copolymerizable with the vinyl chloride monomer. The mixed monomer may include 1 to 50 parts by weight of the copolymerizable vinyl-based monomer, based on 100 parts by weight of the vinyl chloride monomer. If the copolymerizable vinyl-based monomer is included in the above-explained range, there are advantages of performing suspension polymerization stably, and achieving excellent processability of a vinyl chloride-based polymer that is a final product. The vinyl-based monomer may be one or more selected from the group consisting of: olefin compounds such as ethylene and propylene; vinyl esters such as vinyl acetate and vinyl propionate; unsaturated nitriles such as acrylonitrile; vinyl alkyl ethers such as vinyl methyl ether and vinyl ethyl ether; unsaturated fatty acids such as acrylic acid, methacrylic acid, itaconic acid and maleic acid; and fatty acid anhydrides thereof.

In this step, a solvent for suspension polymerization may be used, and the solvent may be de-ionized water. The amount of the solvent used may be suitably controlled according to the size of a polymerization reactor and the amount of monomer. For example, 70 parts by weight or more, based on 100 parts by weight of the vinyl chloride-based monomer may be used. The solvent may be mixed and injected together with the mixed dispersant and the metal carbonate in step S1.

In this step, a polymerization initiator for initiating the polymerization reaction may be used. The polymerization initiator may be used in 0.02 to 0.2 parts by weight, based on 100 parts by weight of the vinyl chloride-based monomer that is to be polymerized. If the polymerization initiator is used in less than 0.02 parts by weight, polymerization reaction time may increase, and a conversion ratio into a vinyl chloride-based polymer may decrease to deteriorate productivity. an If the amount is greater than 0.2 parts by weight, the polymerization initiator may be incompletely consumed during a polymerization process, and remain in a finally prepared vinyl chloride-based polymer slurry, and thermal stability, etc. may be degraded. More particularly, the polymerization initiator may be used in 0.04 to 0.12 parts by weight, based on 100 parts by weight of the vinyl chloride-based monomer.

The polymerization initiator may be peroxide-based compounds such as dicumyl peroxide, dipentyl peroxide, di-3,5,5-trismethyl hexanoylperoxide, and dilauroyl peroxide; peroxydicarbonate-based compounds such as diisopropyl peroxydicarbonate, di-sec-butyl peroxydicarbonate and di-2-ethylhexyl peroxydicarbonate; peroxyester-based compounds such as t-butylperoxy pyvalate, 1,1,3,3-tetramethylbutyl peroxyneodecanoate, and t-butyl peroxyneodecanoate; azo-based compounds such as azobis-2,4-dimethylvaleronitrile; hydroperoxide-based compounds such as t-butyl hydroperoxide; or sulfate-based compounds such as potassium persulfate and ammonium persulfate, and any one or a mixture of two or more thereof may be used.

In this step, the polymerization may be performed in a temperature range of 50 to 65° C., more particularly, 50 to 60° C. In addition, since the polymerization reaction of the vinyl chloride-based polymer is an exothermic reaction, a heat removing process may be performed through a reactor jacket and a reflux cooler (R/CN) to minimize the temperature change during the polymerization process. If the polymerization reaction is performed in the above-described temperature range, foam production may be prevented, and repolymerization and the production of scales may be suppressed. In addition, in the temperature range, the decomposition of the polymerization initiator remaining at the last stage of the reaction may be induced, and a vinyl chloride-based polymer having even better physical properties may be prepared after the reaction.

In this step, additives such as an antioxidant, a base, a crosslinking agent, a polymerization regulator, a chain transfer agent, an antistatic agent, a scale preventing agent, and a surfactant may be additionally added, and the type and amount of the additive are not specifically limited, and common types and amounts known in this art may be used. The additive may be added at any point during the polymerization process, and may be added in batch or continuously.

Vinyl Chloride-Based Polymer

The present invention provides a vinyl chloride-based polymer prepared by using the above-explained method for preparing a vinyl chloride-based polymer. Particularly, the present invention provides a vinyl chloride-based polymer with the content of the vinyl chloride-based polymer in a surface layer, measured by XPS analysis of 50% or more.

If a vinyl chloride-based polymer is prepared using suspension polymerization, a final product is obtained of a type in which a vinyl chloride-based polymer is present inside, and a dispersant surrounds its surface. In this case, a region forming the surface is called a skin layer, and generally, if the thickness of the skin layer increases, a melting rate is reduced, and melting time tends to increase. Such a thickness of the skin layer could be inferred from the content of the vinyl chloride-based polymer in the surface, obtained by the XPS analysis of the surface of the polymer particle obtained, and particularly, if the content of the vinyl chloride-based polymer in the surface decreases, the skin layer is evaluated to be thin.

In relation, if the above-explained method for preparing a vinyl chloride-based polymer of the present invention is used, the content of the dispersant in the surface of the polymer particle may be reduced, and the content of the vinyl chloride-based polymer may increase to obtain a vinyl chloride-based polymer having a skin layer or small thickness. Particularly, if the preparation method of the present invention is used, a vinyl chloride-based polymer having the content of the vinyl chloride-based polymer in the surface layer of 50% or more may be obtained. The vinyl chloride-based polymer of the present invention has a skin layer of small thickness, and a melting rate may be fast.

The content of the vinyl chloride-based polymer in the surface layer may be measured using XPS analysis through the method described below.

1) Materials composing the surface of the vinyl chloride-based polymer are supposed to be only PVC, PVA and PVAc.
2) The relative ratio between carbon (C) and chlorine (Cl) in PVC particles is calculated using PVC prepared by bulk polymerization without using a dispersant (C:Cl=2.17:1). The PVC prepared by the bulk polymerization is composed of only PVC, and the relative ratio calculated above is a relative ratio between C and Cl in pure PVC. The content of the PVC is calculated backward from the content of Cl measured in the surface layer of a target vinyl chloride-based polymer using the relative ratio thus calculated.
3) The content of PVAc is calculated using a specific BE value shown at carbonyl peaks present in PVAc among C peaks.
4) The residual C peaks obtained by subtracting the contents of PVC and PVAc from the total content, is set to the content of PVC.
5) The content of PVC based on the total content of the contents of PVC, PVA and PVAc calculated through the above processes, ((PVC/(PVC+PVA+PVAc))×100, is defined as the content of the vinyl chloride-based polymer.

Common XPS equipment can be used, for example, K-ALPHA+ (manufacturer: Thermofisher) could be used.

Further, the vinyl chloride-based polymer of the present invention may have cold plasticizer absorption (CPA) of 18% or more. Particularly, the vinyl chloride-based polymer of the present invention has a small skin layer thickness and a fast melting rate, and may have high CPA of 18% or more in line with this. In addition, the vinyl chloride-based polymer of the present invention may have a bulk density of 0.580 g/cm$^3$ or more. The bulk density and CPA are in a trade-off relationship, but the vinyl chloride-based polymer particles of the present invention have a shape relatively closer to a sphere in contrast to the vinyl chloride-based polymer prepared by the conventional method, and thus, may show high bulk density, though showing high CPA at the same time.

The vinyl chloride-based polymer of the present invention may have a spherical particle shape, particularly, a spherical particle shape with an aspect ratio of 1 to 1.2.

Hereinafter, preferred embodiments will be explained to assist the understanding of the present invention. However, the embodiments are only illustrations of the present invention and are not intended to limit the scope of the present invention.

EXAMPLES

Example 1

To a stainless polymerization reactor with an inner volume of 1 m$^3$, equipped with a refluxing condenser and a stirrer, 130 parts by weight of polymerization water, 0.02 parts by weight of sodium carbonate, 0.055 parts by weight of polyvinyl alcohol having a degree of hydration of 88 mol %, 0.025 parts by weight of polyvinyl alcohol having a degree of hydration of 72 mol %, 0.009 parts by weight of polyvinyl alcohol having a degree of hydration of 55 mol %, 0.011 parts by weight of hydroxypropyl methylcellulose, and 0.088 parts by weight of t-butyl peroxyneodecanoate (BND) were added, and the inside of the reactor was degassed using a vacuum pump while stirring. Then, 100 parts by weight of a vinyl chloride monomer was injected, and the reaction was performed while keeping the temperature in the polymerization reactor at 57.2° C. The polymerization was stopped at a point where the pressure in the reactor was dropped to 1.0 kg/cm$^2$ during the polymerization reaction, and 0.05 parts by weight of triethylene glycol-bis-[3-(3-t-butyl-5-methyl-4-hydroxy phenyl)propionate] was added as an antioxidant. An unreacted monomer was recovered, and a resin slurry was recovered from the polymerization reactor.

Example 2

A resin slurry was obtained by performing the same method as in Example 1 except for using 0.050 parts by weight of the polyvinyl alcohol having a degree of hydration of 88 mol %, 0.028 parts by weight of the polyvinyl alcohol having a degree of hydration of 72 mol %, 0.010 parts by weight of the polyvinyl alcohol having a degree of hydration of 55 mol %, and 0.012 parts by weight of the hydroxypropyl methylcellulose.

Example 3

A resin slurry was obtained by performing the same method as in Example 1 except for using 0.06 parts by weight of the polyvinyl alcohol having a degree of hydration of 88 mol %, 0.022 parts by weight of the polyvinyl alcohol having a degree of hydration of 72 mol %, 0.008 parts by weight of the polyvinyl alcohol having a degree of hydration of 55 mol %, and 0.010 parts by weight of the hydroxypropyl methylcellulose.

Comparative Example 1

A resin slurry was obtained by performing the same method as in Example 1 except for not injecting sodium carbonate.

Comparative Example 2

A resin slurry was obtained by performing the same method as in Example 1 except for not injecting sodium carbonate and using 0.045 parts by weight of the polyvinyl alcohol having a degree of hydration of 88 mol %, 0.037 parts by weight of the polyvinyl alcohol having a degree of hydration of 72 mol %, 0.008 parts by weight of the polyvinyl alcohol having a degree of hydration of 55 mol %, and 0.010 parts by weight of the hydroxypropyl methylcellulose.

Comparative Example 3

A resin slurry was obtained by performing the same method as in Example 1 except for injecting sodium carbonate at an injection point after injecting the monomer.

Comparative Example 4

A resin slurry was obtained by performing the same method as in Example 2 except for injecting sodium carbonate at an injection point after injecting the monomer.

Comparative Example 5

A resin slurry was obtained by performing the same method as in Example 3 except for injecting sodium carbonate at an injection point after injecting the monomer.

Comparative Example 6

A resin slurry was obtained by performing the same method as in Example 1 except for using 0.045 parts by weight of the polyvinyl alcohol having a degree of hydration of 88 mol %, 0.037 parts by weight of the polyvinyl alcohol having a degree of hydration of 72 mol %, 0.008 parts by weight of the polyvinyl alcohol having a degree of hydration of 55 mol %, and 0.010 parts by weight of the hydroxypropyl methylcellulose.

Comparative Example 7

A resin slurry was obtained by performing the same method as in Example 1 except for using 0.065 parts by weight of the polyvinyl alcohol having a degree of hydration of 88 mol %, 0.020 parts by weight of the polyvinyl alcohol having a degree of hydration of 72 mol %, 0.008 parts by weight of the polyvinyl alcohol having a degree of hydration of 55 mol %, and 0.007 parts by weight of the hydroxypropyl methylcellulose.

The amount of the polyvinyl alcohol of high hydration in the mixed dispersant used in each of the Examples and Comparative Examples, and the injection point of the sodium carbonate are summarized and shown in Table 1.

TABLE 1

| | Injection point of sodium carbonate | Amount of polyvinyl alcohol of high hydration in mixed dispersant (wt %) |
|---|---|---|
| Example 1 | Before injecting monomer | 55 |
| Example 2 | Before injecting monomer | 50 |
| Example 3 | Before injecting monomer | 60 |
| Comparative Example 1 | Not injected | 55 |
| Comparative Example 2 | Not injected | 45 |
| Comparative Example 3 | After injecting monomer | 55 |
| Comparative Example 4 | After injecting monomer | 50 |
| Comparative Example 5 | After injecting monomer | 60 |
| Comparative Example 6 | Before injecting monomer | 45 |
| Comparative Example 7 | Before injecting monomer | 65 |

Experimental Example 1. Measurement of CPA and Bulk Density of Vinyl Chloride-Based Polymer Each of the resin slurries prepared in the Examples and Comparative Examples was dehydrated and dried to obtain a vinyl chloride-based polymer in a particle shape. With respect to the vinyl chloride-based polymer thus obtained, CPA and bulk density were measured. The CPA was measured according to ASTM D 3367-95, and the bulk density was measured based on ASTM D 1895 Method A. The results are shown in Table 2.

TABLE 2

| | CPA (wt %) | Bulk density (g/cm$^3$) |
|---|---|---|
| Example 1 | 18.7 | 0.581 |
| Example 2 | 19.0 | 0.580 |
| Example 3 | 18.2 | 0.588 |
| Comparative Example 1 | 15.1 | 0.584 |
| Comparative Example 2 | 17.3 | 0.567 |
| Comparative Example 3 | 16.0 | 0.575 |
| Comparative Example 4 | 17.0 | 0.571 |
| Comparative Example 5 | 15.9 | 0.578 |
| Comparative Example 6 | 17.5 | 0.564 |
| Comparative Example 7 | 14.4 | 0.613 |

As shown in the above results, it was confirmed that the vinyl chloride-based polymer of the present invention showed the highest CPA among the Examples and the Comparative Examples and maintained good bulk density. The results mean that the vinyl chloride-based polymer of the present invention will show both excellent mechanical properties and a high melting rate. Particularly, from the results, it could be confirmed that a vinyl chloride-based polymer having such high CPA and good bulk density could be prepared by using 50 to 60 wt % of the polyvinyl alcohol of high hydration in the mixed dispersant and injecting the metal carbonate before the injection of the monomer.

Experimental Example 2. Measurement of Melting Rate

To 300 g of each of the resins prepared in the Examples and the Comparative Examples, 15 g of a Ca—Zn-based stabilizer, 21 g of polyethylene chloride (CPE7000, manufacturer: Weipren), 9 g of $TiO_2$, and 36 g of $CaCO_3$ were injected and mixed for 6 minutes using a mixer (manufacturer: Hanil, product name: HMF-3100S). Then, melting time was measured for 6 minutes using 56 g of the mixture and a Brabender plastograph mixer in conditions of 165° C. and 45 rpm. The results are shown in Table 3.

TABLE 3

| | Melting time (sec) |
|---|---|
| Example 1 | 43 |
| Example 2 | 42 |
| Example 3 | 46 |
| Comparative Example 1 | 54 |
| Comparative Example 2 | 48 |
| Comparative Example 3 | 50 |
| Comparative Example 4 | 49 |
| Comparative Example 5 | 53 |
| Comparative Example 6 | 47 |
| Comparative Example 7 | 57 |

As expected in Experimental Example 1 above, the fastest melting time was measured among the Examples of the present invention, and this means that the vinyl chloride-based polymer of the present invention showed excellent mechanical properties in contrast to the Comparative Examples. Particularly, when comparing Examples 1 to 3 and Comparative Examples 3 to 5, wherein the injection point of the sodium carbonate was different, it could be confirmed that the melting time of Comparative Examples 3 to 5 in which the sodium carbonate was injected after injecting the monomer, was longer by about 7 seconds. From the results, it could be confirmed that the mechanical properties of the polymer finally prepared could be changed according to the injection point of the metal carbonate.

Experimental Example 3. Measurement of the Content of Vinyl Chloride-Based Polymer in Surface Layer Each of the resin slurries obtained in the Examples and Comparative Examples was dehydrated and dried to obtain a vinyl chloride-based polymer in a particle shape, and the content of the vinyl chloride-based polymer in the surface layer of a corresponding particle was measured. The content was calculated subject to the conditions below.

The content of the vinyl chloride-based polymer in the surface layer was calculated using XPS analysis and through a method below. As an XPS analysis equipment, K-ALPHA+(manufacturer: Thermofisher) was used.

1) Materials composing the surface of the vinyl chloride-based polymer are supposed to be only PVC, PVA and PVAc.
2) The relative ratio between carbon (C) and chlorine (Cl) in PVC particles is calculated using PVC prepared by bulk polymerization without using a dispersant (C:Cl=2.17:1). The PVC prepared by the bulk polymerization is composed of only PVC, and the relative ratio calculated above is a relative ratio between C and Cl in pure PVC. The content of the PVC is calculated backward from the content of Cl measured in the surface layer of a target vinyl chloride-based polymer using the relative ratio thus calculated.
3) The content of PVAc is calculated using a specific BE value shown at carbonyl peaks present in PVAc among C peaks.
4) The residual C peaks obtained by subtracting the contents of PVC and PVAc from the total content, is set to the content of PVC.
5) The content of PVC based on the total content of the contents of PVC, PVA and PVAc calculated through the above processes, ((PVC/(PVC+PVA+PVAc))×100, is defined as the content of the vinyl chloride-based polymer.

The results are shown in Table 4.

TABLE 4

| | The content of vinyl chloride-based polymer in surface layer (%) |
|---|---|
| Example 1 | 50.7 |
| Example 2 | 52.1 |
| Example 3 | 50.2 |
| Comparative Example 1 | 40.2 |
| Comparative Example 2 | 45.5 |
| Comparative Example 3 | 43.9 |
| Comparative Example 4 | 46.1 |
| Comparative Example 5 | 43.5 |
| Comparative Example 6 | 46.1 |
| Comparative Example 7 | 38.2 |

Examples 1 to 3 showed higher content of the vinyl chloride-based polymer in the surface layer in contrast to the Comparative Examples. The results mean that the vinyl chloride-based polymer according to an embodiment of the present invention has the smallest thickness of the skin layer and may be melted easily.

Experimental Example 4. Measurement of the Content of Residual Vinyl Chloride-Based Monomer Each of the resin slurries obtained in the Examples and Comparative Examples was dehydrated to reach a moisture content of 15%, subdivided into 20 g into a paper cup (diameter of 9 cm, height of 12 cm), and dried in an oven of 80° C. for 8 hours. Then, the resultant was put in a vial, and the content of a residual vinyl chloride-based monomer was measured by Headspace-Gas chromatography (HS-GS, measurement conditions: 1 g of the resin was sealed in a 20 ml vial, and the vinyl chloride-based monomer component discharged at 90° C. for 20 minutes was analyzed). The measurement results are shown in Table 5.

TABLE 5

| | Residual vinyl chloride-based monomer |
|---|---|
| Example 1 | 0.13 |
| Example 2 | 0.09 |
| Example 3 | 0.22 |
| Comparative Example 1 | 0.84 |
| Comparative Example 2 | 0.65 |
| Comparative Example 3 | 0.70 |
| Comparative Example 4 | 0.64 |
| Comparative Example 5 | 0.77 |
| Comparative Example 6 | 0.51 |
| Comparative Example 7 | 0.86 |

As seen from the table, it was confirmed that the vinyl chloride-based polymer prepared in the Examples of the present invention showed the markedly low content of the residual vinyl chloride-based monomer component, and this means that the vinyl chloride-based polymer of the present invention is excellent in view of the melting rate and mechanical properties, and is advantageous in view of harmfulness, when compared to the vinyl chloride-based polymer prepared by the conventional method.

The invention claimed is:

1. A method for preparing a vinyl chloride-based polymer, the method comprising:

injecting a mixed dispersant and a metal carbonate into a polymerization reactor (S1); and polymerizing a vinyl chloride-based monomer in the presence of the mixed dispersant and the metal carbonate (S2), wherein the mixed dispersant comprises polyvinyl alcohol having a degree of hydration of 80 mol % or more, an amount of the polyvinyl alcohol in the mixed dispersant is 50 to 60 wt %, and the metal carbonate is used in an amount of 0.01 to 0.03 parts by weight based on 100 parts by weight of the vinyl chloride-based monomer.

2. The method for preparing a vinyl chloride-based polymer according to claim 1, wherein the mixed dispersant and the metal carbonate are pre-mixed and injected into the polymerization reactor.

3. The method for preparing a vinyl chloride-based polymer according to claim 1, wherein the mixed dispersant further comprises polyvinyl alcohol having a degree of hydration of less than 80 mol %, and a cellulose-based dispersant.

4. The method for preparing a vinyl chloride-based polymer according to claim 3, wherein the cellulose-based dispersant is one or more selected from the group consisting of methyl cellulose, hydroxyethyl cellulose and hydroxypropyl methylcellulose.

5. The method for preparing a vinyl chloride-based polymer according to claim 1, wherein the metal carbonate is one or more selected from the group consisting of sodium carbonate ($Na_2CO_3$), potassium carbonate ($K_2CO_3$), and sodium bicarbonate ($NaHCO_3$).

6. The method for preparing a vinyl chloride-based polymer according to claim 1, wherein the mixed dispersant is used in 0.05 to 0.15 parts by weight based on 100 parts by weight of the vinyl chloride-based monomer.

7. The method for preparing a vinyl chloride-based polymer according to claim 1, wherein the polymerization is performed at 50 to 65° C.

* * * * *